(12) United States Patent
Doerfler et al.

(10) Patent No.: US 7,306,298 B2
(45) Date of Patent: Dec. 11, 2007

(54) FLAT PANEL ASSEMBLY FOR A DRAWER TOWER

(75) Inventors: Matthew J. Doerfler, Wooster, OH (US); Patrick Flanagan, Chippewa Lake, OH (US); Gina Rodi, Wooster, OH (US)

(73) Assignee: Rubbermaid Incorporated, Wooster, OH (US)

( * ) Notice: Subject to any disclaimer, the term of this patent is extended or adjusted under 35 U.S.C. 154(b) by 374 days.

(21) Appl. No.: 10/444,474

(22) Filed: May 23, 2003

(65) Prior Publication Data

US 2003/0230957 A1    Dec. 18, 2003

Related U.S. Application Data

(60) Provisional application No. 60/382,820, filed on May 23, 2002.

(51) Int. Cl.
*A47B 43/00* (2006.01)

(52) U.S. Cl. .................................. 312/258; 312/257.1

(58) Field of Classification Search ............ 312/257.1, 312/258, 259, 261, 330.1, 334.7, 334.44, 312/348.1, 350, 351
See application file for complete search history.

(56) References Cited

U.S. PATENT DOCUMENTS

| 1,900,338 | A | * | 3/1933 | Hanson ................ 312/334.44 |
| 2,534,100 | A | * | 12/1950 | Baumgartner ............ 220/345.4 |
| 2,853,350 | A | * | 9/1958 | Mandel ....................... 312/107 |
| 3,462,208 | A | * | 8/1969 | Black et al. ................ 312/352 |
| 3,639,027 | A | * | 2/1972 | Higdon, Jr. .............. 312/348.1 |
| 3,653,735 | A | * | 4/1972 | Duepree .................. 312/330.1 |
| 4,080,023 | A | * | 3/1978 | Bair ........................... 312/259 |
| 4,116,513 | A | * | 9/1978 | Ullman, Jr. .............. 312/348.2 |
| 4,561,706 | A |   | 12/1985 | Grati |
| 4,671,580 | A | * | 6/1987 | Shiou ...................... 312/265.5 |
| 5,466,058 | A | * | 11/1995 | Chan .......................... 312/111 |
| 5,520,436 | A | * | 5/1996 | Rader et al. ........... 297/188.11 |
| 6,113,203 | A | * | 9/2000 | Chen .......................... 312/258 |
| 6,474,759 | B2 | * | 11/2002 | Hsu ............................ 312/263 |
| 2002/0105252 | A1 | * | 8/2002 | Dorman ................... 312/257.1 |

FOREIGN PATENT DOCUMENTS

| DE | 3643 526 A1 | | 7/1988 |
| DE | 39 01 481 A1 | | 7/1990 |
| WO | WO 99/13280 | * | 3/1999 |
| WO | WO 99/22150 | | 5/1999 |

OTHER PUBLICATIONS

International Preliminary Examining Authority Written Opinion (PCT Rule 66) in related Application No. PCT/US 03/16623, dated Mar. 16, 2004.

* cited by examiner

*Primary Examiner*—James O. Hansen
(74) *Attorney, Agent, or Firm*—Marshall, Gerstein & Borun LLP

(57) ABSTRACT

A flat panel assembly for a drawer tower includes a left panel including a left rail adapted to slidably receive a rim of a drawer, a right panel including a right rail adapted to slidably receive a rim of a drawer, and a back panel foldably integral with the left panel along a first joint, and foldably integral with the right panel along a second joint.

12 Claims, 9 Drawing Sheets

FLAT PANEL ASSEMBLY FOR A DRAWER TOWER

CROSS REFERENCE TO RELATED APPLICATIONS

This application claims priority to U.S. Provisional Application 60/382,820, filed on May 23, 2002.

FIELD OF THE INVENTION

The present invention relates generally to a drawer tower for holding drawers, shelves, and the like and, more specifically, to a flat panel assembly that can be configured as a drawer tower.

BACKGROUND OF THE INVENTION

Plastic drawer towers are most commonly made with a series of frames connected to each other. Each frame only accommodates a single drawer and has its own molded-in risers. A separate cover is connected at the top to enclose the drawers. In other drawer towers, the risers are molded separately and mechanically attach to the frames at both top and bottom. Drawers of different heights can be used in a single tower but each drawer requires a separate and unique frame. The frames of both aforementioned examples must be fastened together, increasing the number of parts required to assemble the drawer tower as well as increasing/decreasing the overall height of the unit.

The towers are labor intensive to assemble, require slides in the molds to form structure for a positive connection between parts, and need to have vertical draft to be molded, which precludes the front opening from being square with the drawer.

Drawers currently ride along their bottom surface making them difficult to open when they hold any substantial amount of weight since the weight that the drawer is carrying causes the bottom of the drawer to deflect downwards and catch on the frame below the drawer. Drawers that slide along their bottoms also tend to tip downward when opened. This causes the drawers to fall out of the frame. With the drawer open and loaded, the whole tower tips forward toward the user of the drawer.

Friction or interference fits to connect the components of the frames may simplify the mold. However, in some applications such friction fit components may not allow for a robust frame design that holds together well when moved.

DETAILED DESCRIPTION

The embodiments described herein are not intended to be exhaustive or to limit the scope of the invention to the precise form or forms disclosed. Instead, the following embodiments have been described in order to best explain the principles of the invention and to enable others skilled in the art to follow its teachings.

Figure 1:
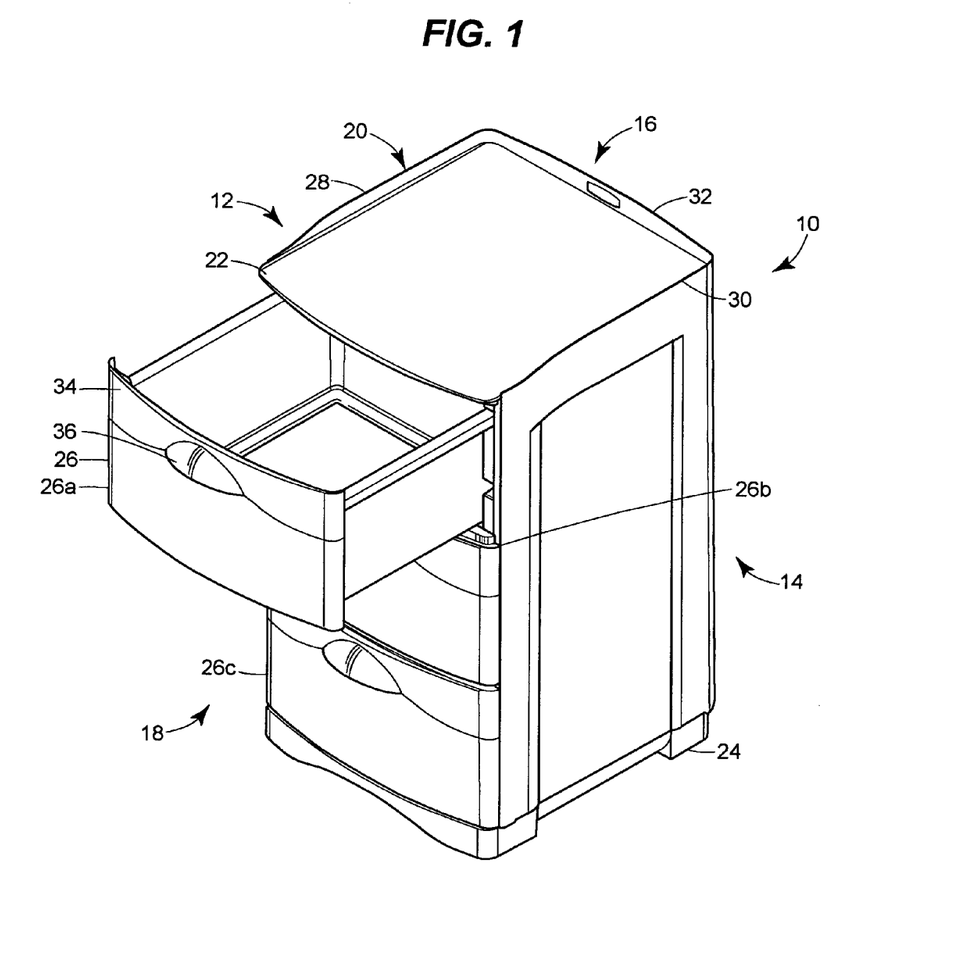
FIG. 1 is a front perspective view of a drawer tower assembly constructed in accordance with the teachings of the present disclosure.

Referring now to FIG. 1, a drawer tower assembly generally referred to by the reference numeral 10 is shown. The drawer tower assembly 10 defines a left hand side 12, a right hand side 14, a back side 16, and a front side 18. The drawer tower assembly 10 includes a panel assembly 20, a top panel 22, a base 24, and a plurality of drawers 26. The panel assembly includes a left panel 28, a right panel 30, and an interconnecting back panel 32. The left panel 28 and right panel 28 are used to support the drawers 26 in a suspended and slidable state, as will be seen later. In this example, a total of three drawers 26a, 26b, and 26c are shown. However, as, will be explained, more or less drawers 26 can be used in the drawer tower assembly 10.

Figure 2:
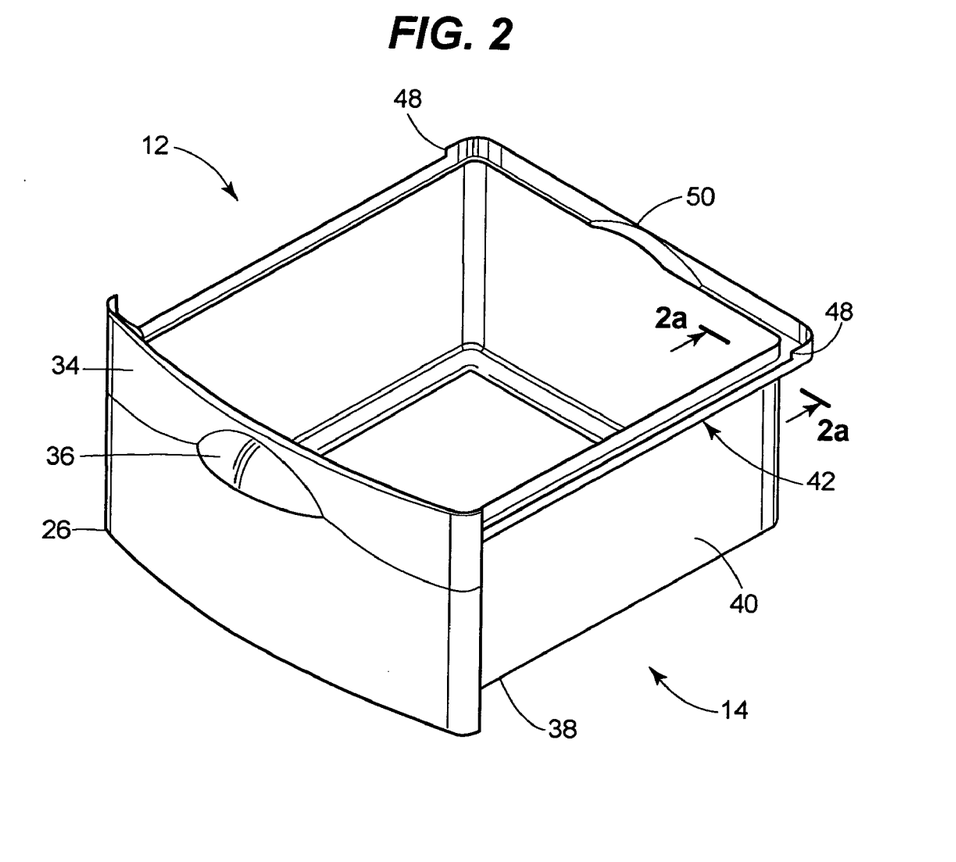
FIG. 2 is a perspective view of a drawer adapted to be used with the drawer tower assembly of FIG. 1.
Figure 2A:
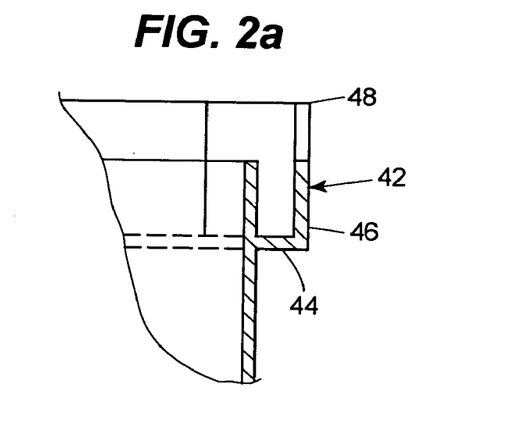
FIG. 2a is a fragmentary cross-sectional view taken along line 2a-2a of FIG. 2.

Referring now to FIG. 2 and 2a, each drawer 26 in this example has a front face 34 with a front handle 36 disposed thereon, a bottom 38, and a continuous sidewall 40 extending up from an outer periphery of the bottom 38. Disposed near the top of the continuous sidewall 40 is a sliding rail 42, shown in cross section in FIG. 2a. The sliding rail 42 is generally U-shaped, with a laterally extending rim 44 and an outside wall 46 extending upwards from the rim 44. The rim 44 can be used to slidably support the drawer 26 in the panel assembly 20. The outside wall 46 includes a stop 48. The stop 48 is a portion of the outside wall 46 that extends higher than the outside wall 46 along the left side 12 and right side 14. As will be seen later, the stop 48 prevents the drawer 26 from being slid out of the drawer tower 10 accidentally. The drawer 26 further can include a rear handle 50 on the back side 16. The rear handle 50 can be used to carry the drawer 26 in conjunction with the front handle 36 when the drawer 26 is removed from the panel assembly 20.

Figure 3:
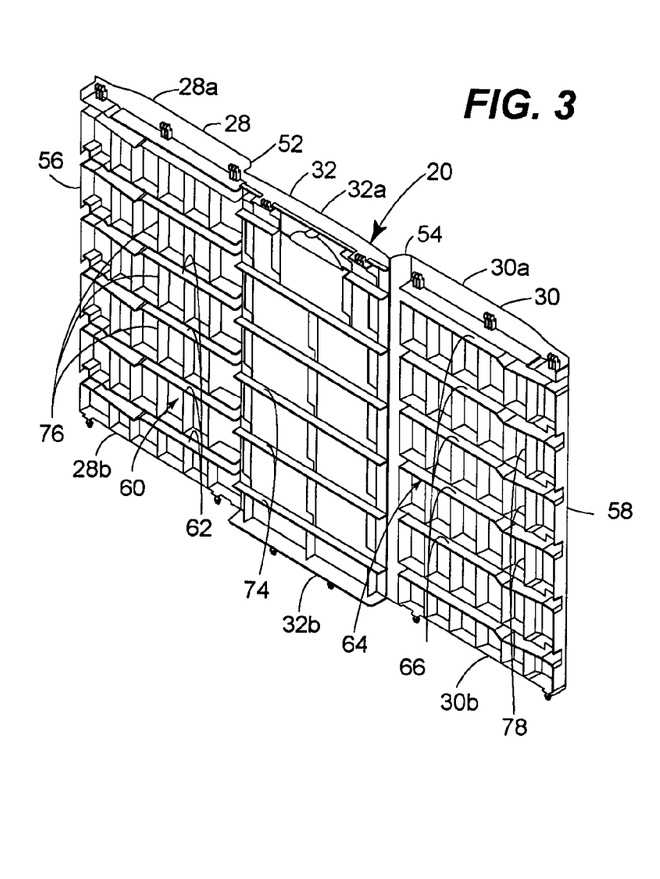
FIG. 3 is a front perspective view of a flat panel assembly used to constructed the drawer tower of FIG. 1, showing the assembly in a generally flat configuration.
Figure 4:
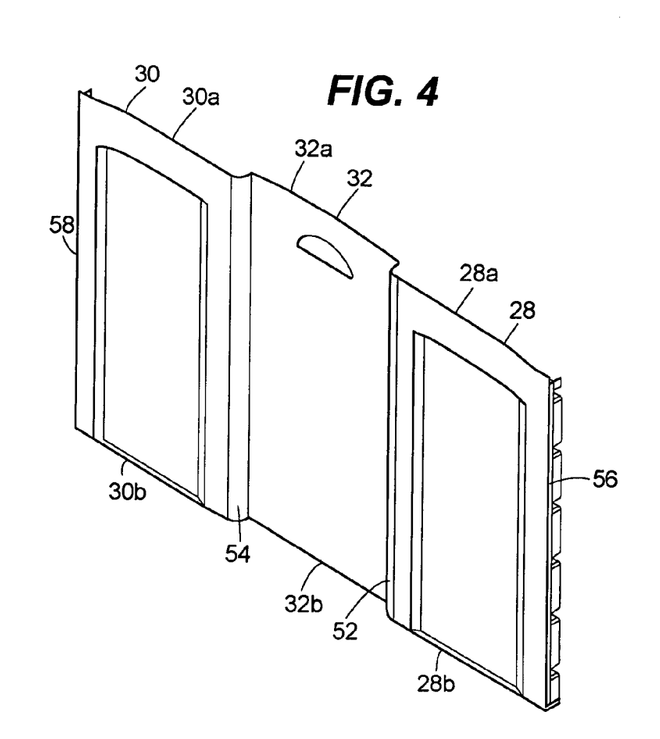
FIG. 4 is a rear perspective view of the flat panel assembly of FIG. 3.

Now referring to FIGS. 3 and 4, the panel assembly 20 is shown in a substantially flat configuration, i.e. the left panel 28, the right panel 30, and the back panel 32 lie in substantially the same plane. Each of the left panel 28, the right panel 30, and the back panel 32, includes a top portion 28a, 30a, and 32a, respectively. Similarly, each of the left panel 28, the right panel 30, and the back panel 32, includes a lower portion 28b, 30b, 32b respectively. The left panel 28 meets the back panel 32 along a first joint 52, while the right panel 30 meets the back panel 32 along a second joint 54. The left panel 28 includes a left edge 56 opposite the first joint 52, while the right panel 30 includes a right edge 58 opposite the second joint 54.

Figure 7:
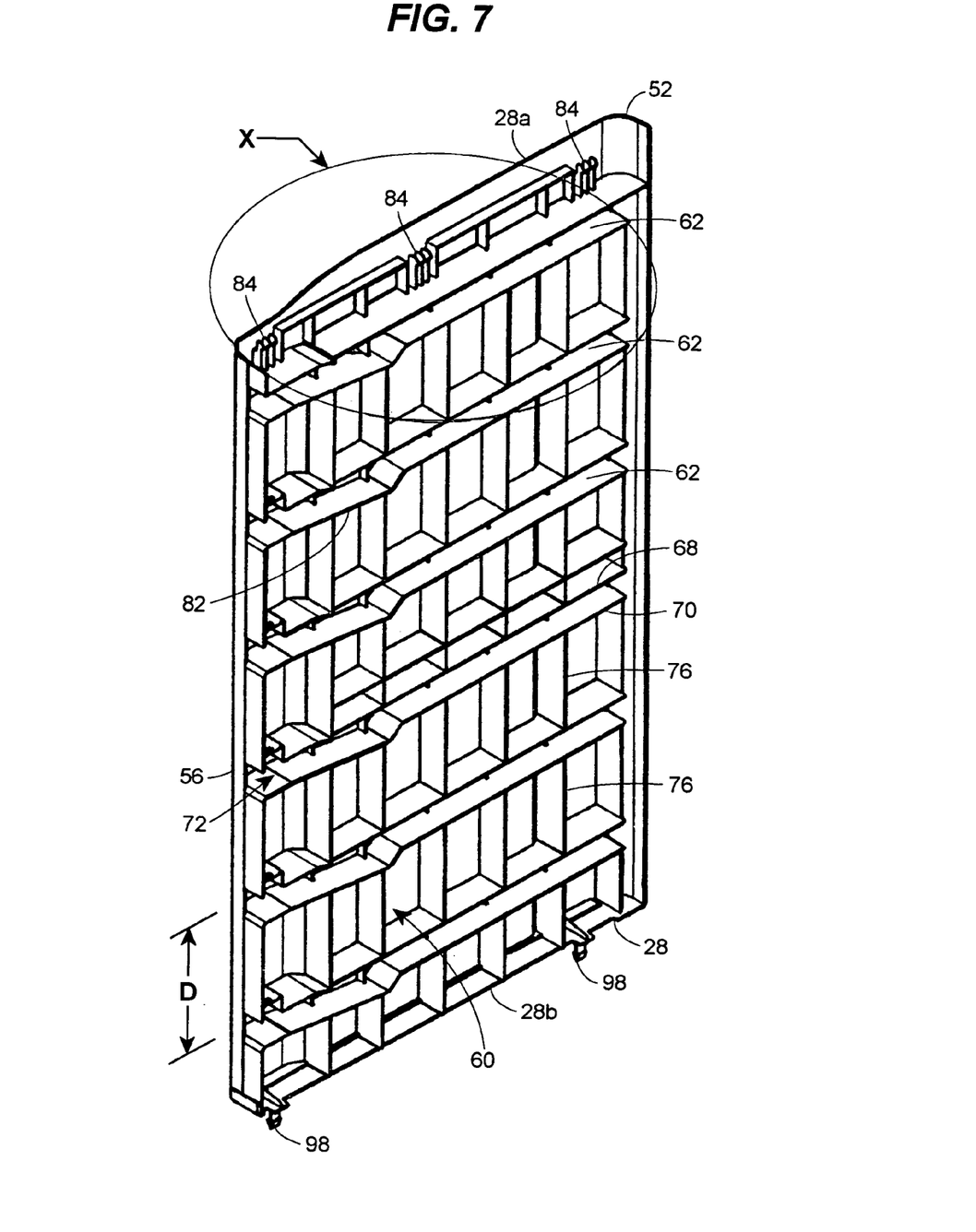
FIG. 7 is a perspective view of the inside face of the left side panel of the assembly of FIG. 5.

As seen in FIGS. 3 and 7, the left panel 28 includes an inside face 60 on which a number of rails 62 generally extend between the first joint 52 and the left edge 56. Similarly, the right panel 32 includes an inside face 64 on which a number of rails 66 generally extend between the second joint 54 and the right edge 58. As seen best in FIG. 7, each rail 62 is defined by an upper bar 68 and a lower bar 70 between which is a receiving area 72. The receiving area 72 is sized to accept the sliding rail 42 of the drawer 26.

In this example, a total of six rails 62, 66 are disposed on each of the left panel 28 and the right panel 30. Again, more or less rails 62, 66 could be employed. In this example, the rail 62, 66 are spaced a consistent distance D apart. Also in this example, the three drawers 26a, 26b, 26c each have an approximate height of 2 D. It can be seen that different combinations of drawer sizes can easily be substituted, such as, for example, two drawers of height 3 D, six drawers of height D, or one drawer of height D, one drawer of height 2 D, and one drawer of height 3 D. In examples where the drawer has a height 2 D or greater, at least one set of rails 62, 66 is not used.

The back panel 32 (FIG. 3) includes a number of supports 74. Each support 74 is disposed at an elevation similar to that of the lower bar 70 of a rail 62, 66. The support 74 can help bear the rim 44 of the drawer 26 when the drawer 26 is fully inserted into the panel assembly 20.

The inside face 60 of the left panel 28 also preferably includes a number of generally vertically extending reinforcing ribs 76, while the inside face 64 of the right panel 30 includes a plurality of generally vertically extending reinforcing ribs 78.

The panel assembly 20 can be manufactured in this flat configuration as shown for advantages in the molding process as will be detailed later. In this example, the first joint 52 and the second joint 54 are molded in, or living hinges. Thus, the left panel 28 and the back panel 32 are flexibly joined along the first joint 52, and the right panel 30 and the back panel 32 are flexibly joined along the second joint 54.

Figure 5:
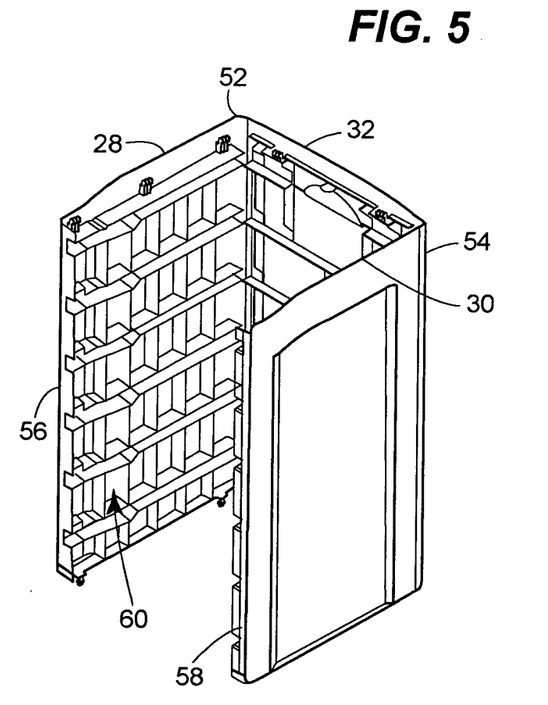
FIG. 5 is a front perspective view of the flat panel drawer tower assembly of FIGS. 3 and 4, showing the assembly in a position configured to accept drawers.
Figure 6:
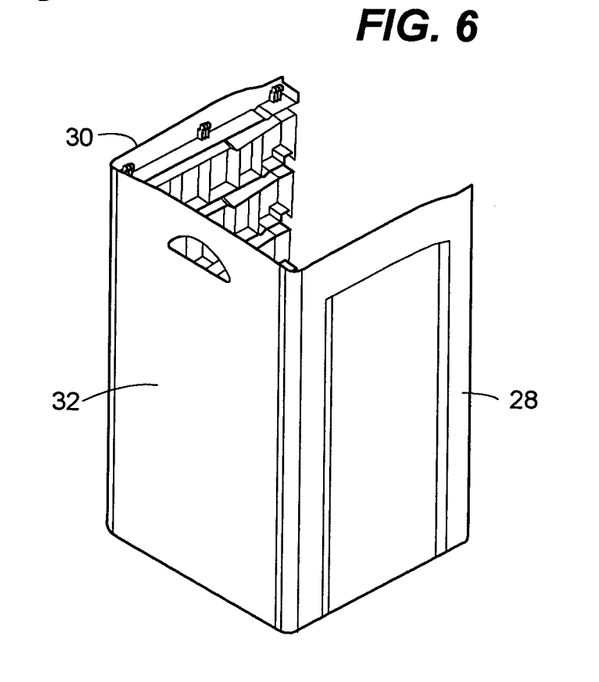
FIG. 6 is a rear perspective view of the flat panel drawer tower of FIG. 5.

Accordingly, during assembly, the left panel 28 and the right panel 30 simply may be folded into the configuration shown in FIGS. 5 and 6. The left panel 28 is shown to be disposed to the back panel 32 at substantially a 90° angle along the first joint 52. Further, the right panel 30 is also shown to be disposed to the back panel 32 at substantially a 90° angle along the second joint 54. In this configuration, the left panel 28 and the right panel 30 are substantially parallel to each other, with the left edge 56 and the right edge 58 generally forming a front edge of the tower assembly. This adds structural integrity as well as simplifies assembly by not requiring the panels to be fastened together at a later manufacturing stage.

Figure 8:
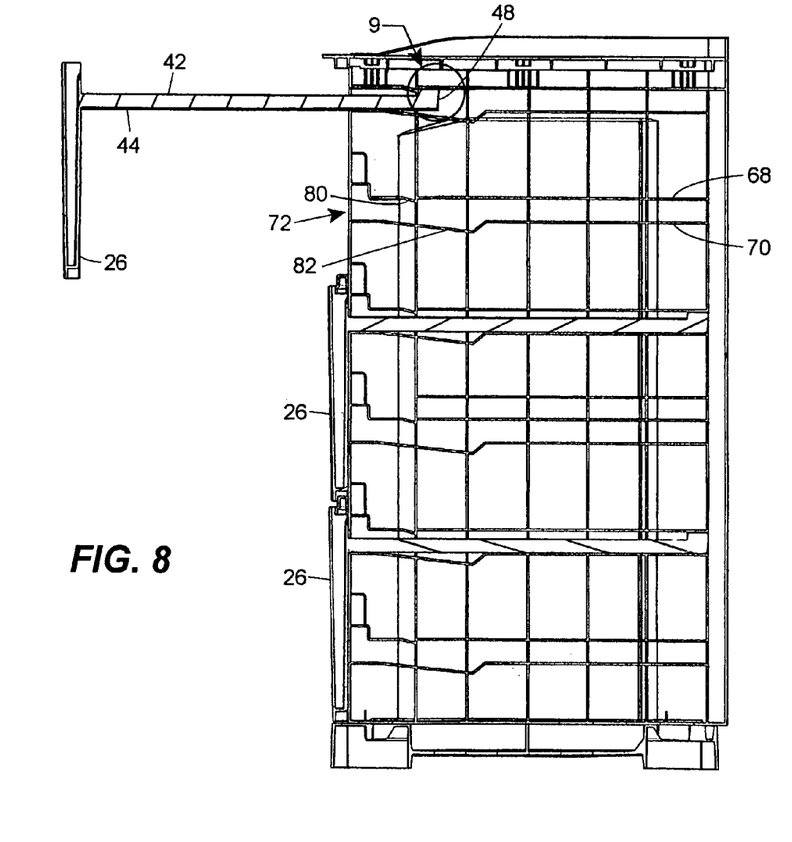
FIG. 8 is a cut away view of the left side panel with a set of drawers inserted therein.
Figure 9:
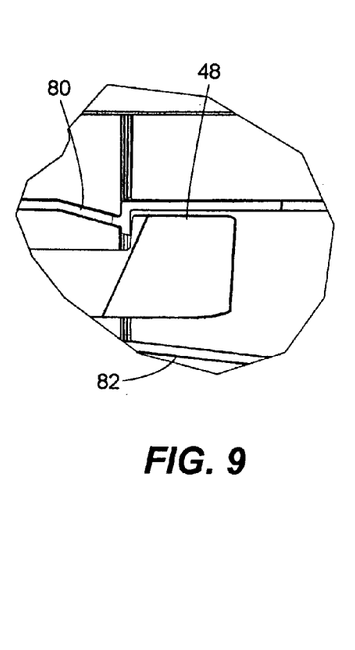
FIG. 9 is a detail view taken from circle IX in FIG. 8.

Referring now to FIGS. 7, 8, and 9, the rim 44 of a drawer 26 is shown sliding in a rail 62 in a cut-away drawing. This configuration is known as a lift and slide. As mentioned before, the rails 62 include an upper bar 68, a lower bar 70, and a receiving area 72 through which the drawer sliding rail 42 is inserted during assembly. The rim 44 of the drawer 26 can slide along the lower bar 70 of the rail 62 which supports the drawer 26 and allows the drawer 26 to slide in and out. Referring to FIGS. 8 and 9, the upper bar 68 includes a blocker 80, which ensures that a drawer 26 does not accidentally slide out of the rail 62. The blocker 80 extends downward from the upper bar 68 near the left edge 56 (for the left panel). This configuration is mirrored on the right panel 30. If the drawer 26 is pulled out too far, the stop 48 extending up from the rim 44 on the drawer 26 contacts the blocker 80, and the movement of the drawer 26 toward the front side 18 is stopped.

The lower bar 70 includes a shoulder 82, where the lower bar 70 angles downward, thereby increasing the distance between the upper bar 68 and lower bar 70. This provides room for the stop 48 to pass by the blocker 80 when the drawer 26 is intentionally removed from the panel assembly 20, or when the drawer 26 is inserted into the panel assembly 20. The drawer 26 simply must be tilted for the stop 48 to clear the blocker 80 during removal or installation.

In this example, the drawer 26 is supported solely by the rims 44 engaging the rails 62, 66 rather than the drawer 26 being supported along its bottom 38. According to the disclosed example, such an arrangement minimizes the surface contact and thereby allows the drawers 26 to slide in and out more easily.

Figure 10:
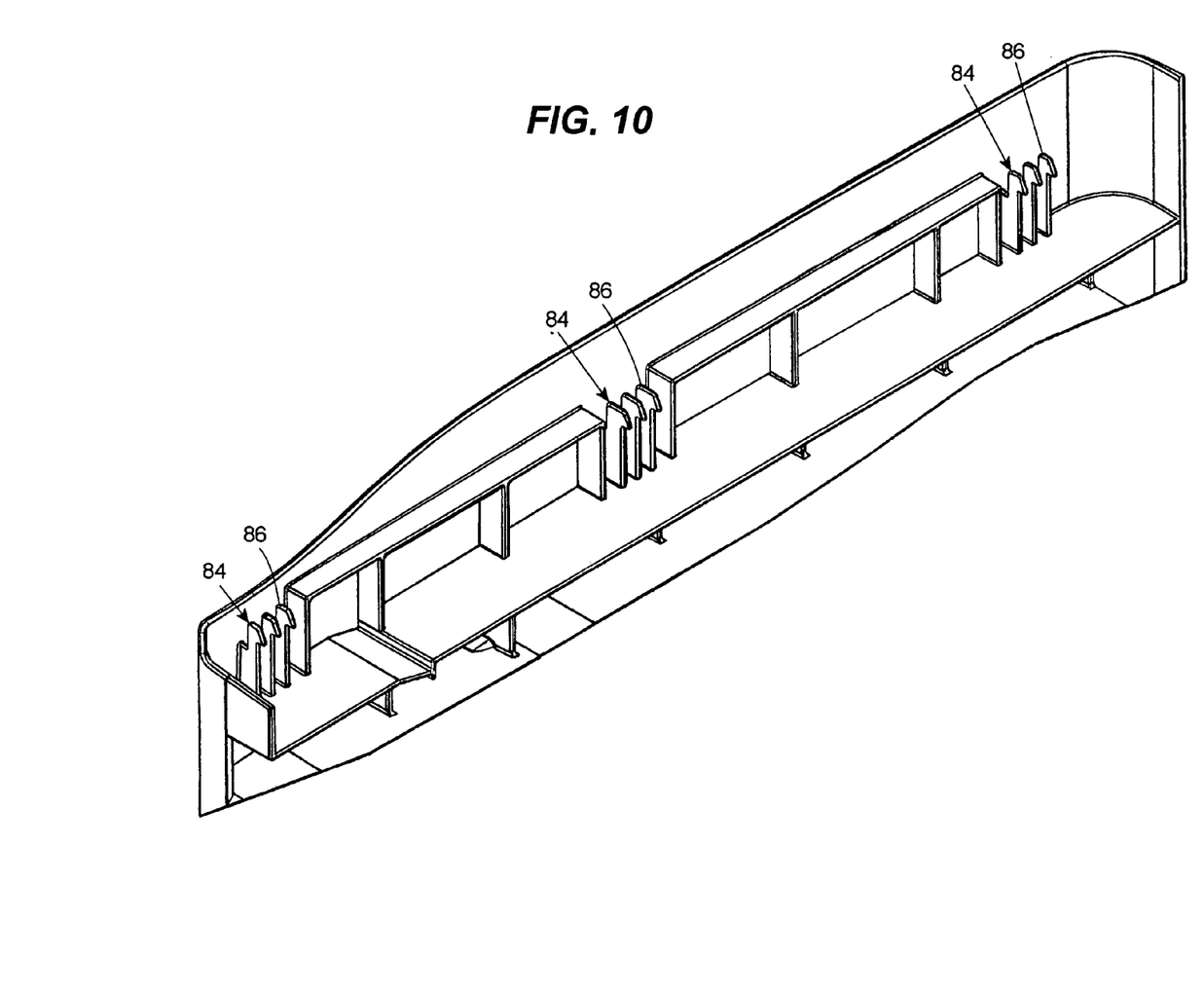
FIG. 10 is a detail view taken from circle X in FIG. 7.
Figure 11:
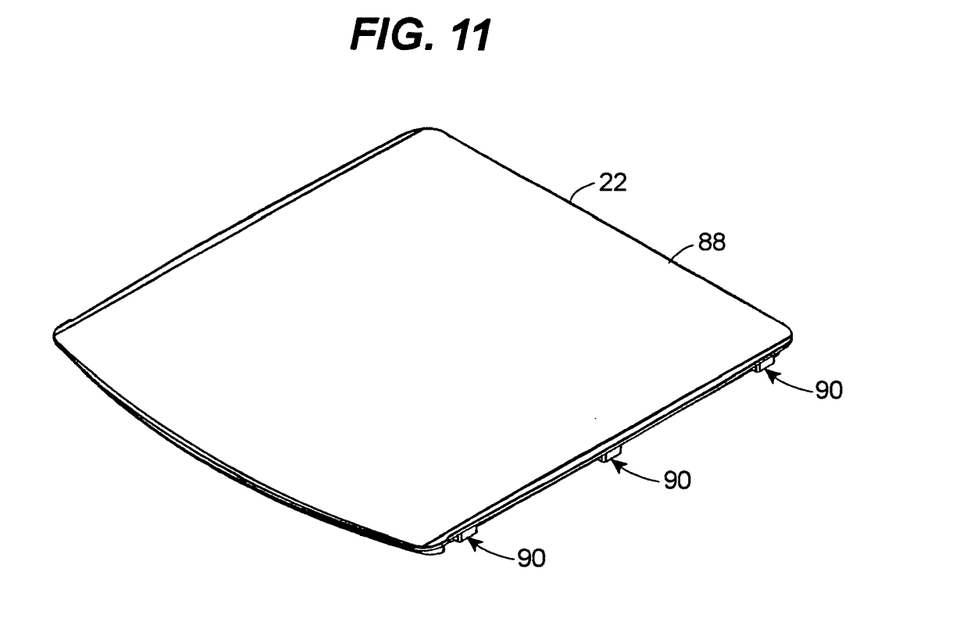
FIG. 11 is a perspective view of one example of a top panel of the assembly of FIG. 1.
Figure 12:
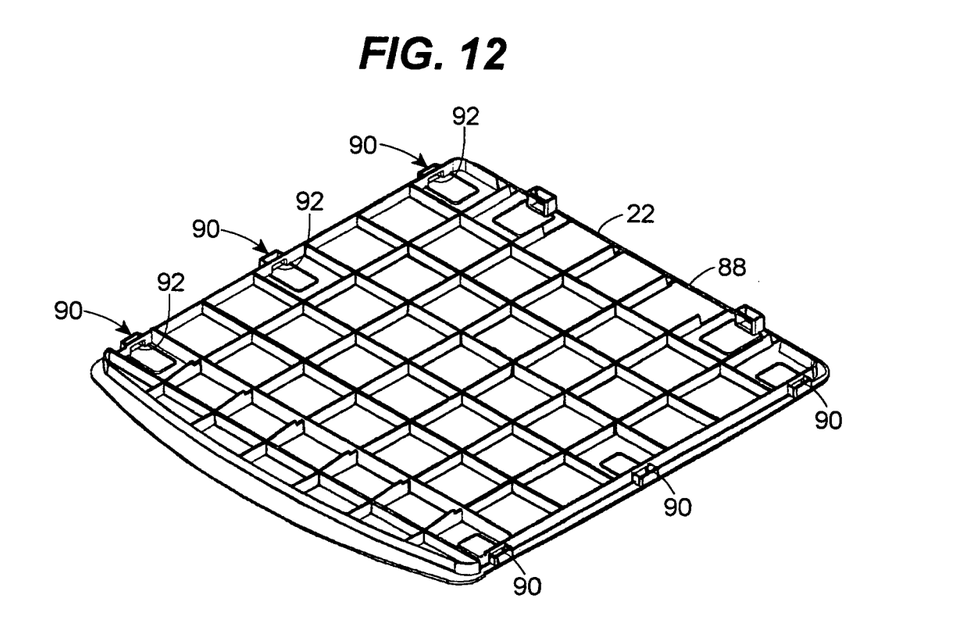
FIG. 12 is a perspective view of the underside of the top panel of FIG. 11.

Referring now to FIGS. 3, 7, and 10, the top portions 28a, 30a, and 32a each include one or more snaps 84, which enable the top cover 22 to snap in place to the top portions 28a, 30a, and 32a, of the left panel 28, the right panel 30, and the back panel 32, respectively. In this example, each of the left panel 28, right panel 30, and back panel 32 include a plurality of resilient hooks 86 (only the left panel shown in FIGS. 7 and 10). The hooks 86 extend upward and inward toward the center of the drawer tower assembly 10.

Referring now to FIGS. 9 and 10, a top view and a bottom view of a top cover 22 is shown. The top cover 22 includes a panel 88 with a plurality of receivers 90 opening from the bottom. The receivers 90 further have a lateral opening 92 on the inside. Thus, during assembly, the top cover 22 is placed onto the top portions 28a, 30a, and 32a of the left panel 28, the right panel 30, and the back panel 32. The hooks 86 are inserted into the receivers 90, and once the panel 88 is lowered into position, the hooks 86 snap inward and through the lateral openings 92. This securely maintains the top cover 22 to the panel assembly 20, as well as helping to maintain the panels 28, 30, and 32 in a fixed angular relationship with each other, when the tower is set up to receive drawers.

Figure 13:
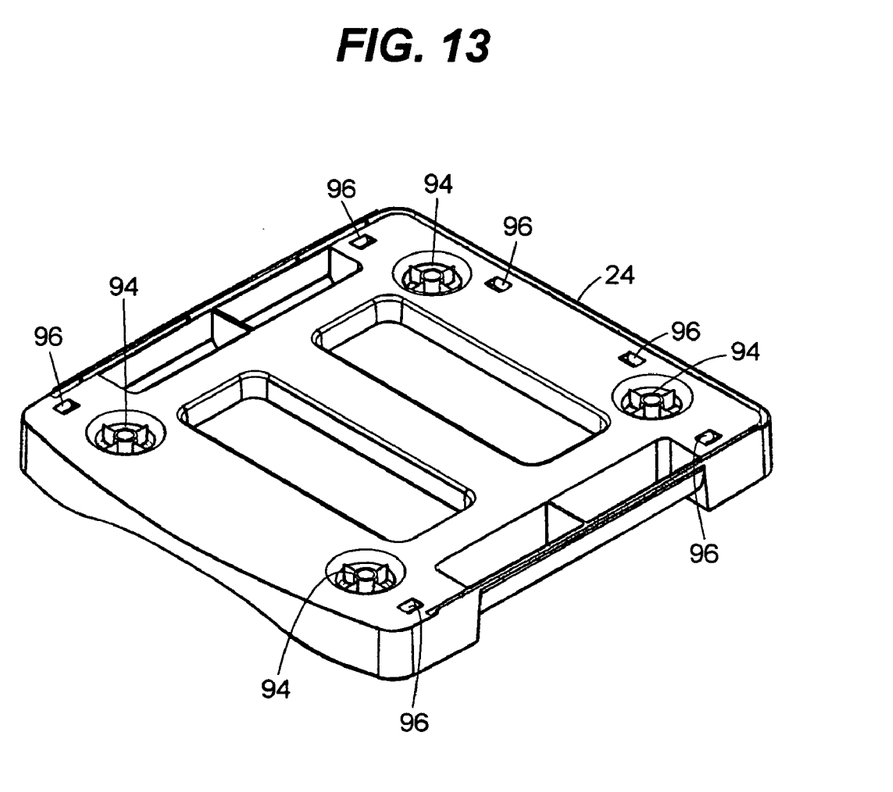
FIG. 13 is a perspective view of one example of a base of the assembly of FIG. 1.

Referring now to FIG. 13, a base 24 for the drawer tower assembly 10 is shown. The base 24 supports the weight of the drawer tower assembly 10 and also helps to maintain the left panel 28, right panel 30, and back panel 32 in the set up fixed angular relationship. The base includes caster receivers 94 for inserting casters (not shown) such that the drawer tower assembly 10 can be roller easily. The base 24 further includes snap receivers 96. Referring back to FIG. 7, each of the lower portions 28b, 30b, 32b includes a number of snaps 98. During assembly, the snaps 98 are inserted into the snap receivers 96 of the base 24, thereby securing and engaging the lower portions 28b, 30b, 32b of the left panel 28, the right panel 30, and the back panel 32, respectively.

The flat panel assembly 20 as described herein can be molded using a stack mold. Utilizing a stack mold for the panel assembly 20 produces one complete panel assembly 20 in one machine cycle in the smallest sized machine possible. The stack configuration utilizes two mold faces to place parts one behind the other in the mold. When viewed along the axis of the injection barrel of the molding machine, the projected area of only one part is seen. The projected area is directly related to the clamp tonnage required to hold the mold shut, thus if the projected area of one part is "seen" by the machine, the tonnage required will be half of that required by a side by side, or family, configuration.

As an alternative, one may utilize machines with multiple injection units in addition to or instead of stack molds, but the tower frame assembly 10 may still be produced in one machine cycle. Further, the entire frame (including a top panel and a bottom panel, for example) may be molded as one piece with the top cover 22 and the base 24 hinged to the back panel 16 or to one or the other of the side panels 28, 30. Such a configuration may be more favorable from a labor standpoint, but would require larger tonnage molding machines.

The rails 62 and 66 are preferably oriented such that the left and right panels 28 and 30 are parallel to the platens of an injection molding machine (not shown). Such an arrangement allows the tower assembly 10 to be configured as shown in FIGS. 5 and 6 with the left and right panels 28 and 30 perpendicular to the back panel 32, and with the rails 62 and 66 equidistant from each other along their length from the front edges 56, 58 of the tower assembly 10 to the joints 54, 56 of the tower assembly 10.

In alternative examples, the number and location of the rails 62, 66 on each of the side panels 28 and 30 may be varied. For example, the individual rails could have inconsistent distances from each other. Such an arrangement provides the ability to use the same molded frame to produce a wide variety of product combinations, whether or not the extra rails are utilized in any particular application. Accordingly, the drawer tower assembly 10 may employ a number of different drawers having different vertical dimensions, and may permit the use of combinations of differently sized drawers with differently spaced shelves.

Further, different rail configurations known in the art may be used. For example, rails 62, 66 may be used with or without a lift and slide. The rails 62, 66 may be molded by either using mold inserts or simply by the mold itself.

As a further alternative, the left panel 28, the right panel 30, and the back panel 32 may all be molded separately. Such an arrangement would be less favorable from a labor standpoint and would require some method of mechanical attachment to secure the components together such as, for example, snaps of the type used to hold the top and bottom panels in place.

As a further alternative, the rails 62, 66 may be formed separately and then mechanically attached to the inside faces 60, 64, respectively, rather than having the rails 62, 66 molded into the sidewalls 28, 30.

Also, it will be understood that shelves (not shown) could be inserted into the rails 62, 66, with drawer bottoms riding over the top of the shelf instead of the drawer rims riding on the rails.

Further, inserts could easily be added to the molds to change the appearance of the side panels for further product differentiation. Because of the direction of mold opening and short depth of draw, in-mold labeling can easily be utilized to apply patterns, color, designs, and treatments to the individual panels.

Because the panel assembly 20 is a single integral unit, the panel assembly 20 produces one complete drawer tower assembly 10 in one machine cycle in the smallest sized machine possible.

The flat panel frame concept in accordance with the disclosed example reduces the number of parts required to construct the drawer tower 10 while offering a plurality of drawer sizes in a drawer unit that is one standard height. Molded-in ledges at the tops of the drawers ride between rails molded inside the drawer frame, making them easier to slide in and out and increasing the tip resistance of the unit. Various combinations of, for example, two to six drawers of three different heights can be assembled into the drawer frame minimizing the cost and complexity of the units.

The disclosed example may address one or more disadvantages that may be found in prior art configurations. For example, when the entire frame is molded in one piece and enclosed except for the front, adequate draft for part ejection is required. This makes the back of the drawer opening larger than the front. The drawers can't ride on the rails without falling off, and therefore shelves need to be added to support the drawers. On such an arrangement, the drawers must ride on their bottoms.

According to the disclosed example, the lay-flat frames will provide structure to eliminate shifting and racking of the drawer tower. Fewer pieces to assemble results in less labor required for assembly. In prior art systems, often times a different frame/riser was required per drawer height, necessitating molds for each height frame and also for the drawer.

While the drawer tower assembly 10 has been described with reference to specific examples which are intended to be illustrative only and not to be limiting of the invention, it will be apparent to those of ordinary skill in the art that changes, additions or deletions may be made to the disclosed examples without departing from the spirit and scope of the invention.

We claim:

1. A flat panel assembly for forming a drawer tower assembly, the flat panel assembly comprising:
   a left panel including a left rail adapted to slidably receive a rim of a drawer;
   a right panel including a right rail adapted to slidably receive a rim of a drawer; and
   a back panel joined to the left panel along a first joint and joined to the right panel along a second joint, the first and second joints arranged to permit the left and right panels to fold relative to the back panel to form the drawer tower assembly;
   each of the left rail and the right rail including an upper bar and a lower bar defining a receiving area sized to slidably receive a portion of a drawer, each upper bar and each lower bar including an approximately horizontal portion;
   each upper bar including a blocker extending downwardly toward the lower bar, the blocker sized and shaped to abut a stop on the drawer to prevent the drawer from sliding past the blocker, the blocker disposed on an end of the upper bar opposite the back panel; and
   each lower bar including a recess opposite the blocker and extending away from the upper bar, the recess cooperating with the blocker such that a stop of the drawer can be pulled from behind the blocker to in front of the blocker by angling the drawer downwardly into the recess.

2. The flat panel assembly of claim 1, wherein the first joint comprises a living hinge, and the second joint comprises a living hinge.

3. The flat panel assembly of claim 1, wherein a majority of the lower bar is substantially parallel to the upper bar.

4. The flat panel assembly of claim 1, wherein the back panel includes a drawer support.

5. The flat panel assembly of claim 1, wherein the left panel, the back panel, and the right panel each include a top portion, the top portions including snaps adapted to secure a cover.

6. The flat panel assembly of claim 1, wherein the left panel, the back panel, and the right panel each include a lower portion, the lower portions including snaps adapted to secure a base.

7. The flat panel assembly of claim 1, wherein the left rail is integral with the left panel, and the right rail is integral with the right panel.

8. The flat panel assembly of claim 1, wherein the left panel and the right panel include a plurality of rails the rails being spaced evenly apart in elevation.

9. The flat panel assembly of claim 8, wherein the left panel and the right panel include six rails each.

10. The flat panel assembly of claim 1, wherein the blocker extends perpendicularly to the horizontal portion of the upper bar.

11. A drawer and tower assembly comprising:
a drawer having a front panel, a rear panel, and a left side having an outwardly extending left rim and a right side having an outwardly exending right rim, at least one of the rims including an upwardly extending stop disposed adjacent the rear panel;
a tower assembly comprising a left panel, right panel, and a back panel, the left and right panels foldable relative to the back panel to form a tower;
the left panel including an upper rail, a lower rail, and a left receiving area between the upper and lower rails sized to receive the left rim;
the right panel including an upper rail, a lower rail, and a right receiving area between the upper and lower rails sized to receive the right rim;
each of the lower rails including a flat portion and a recess;
at least one of the upper rails including a downwardly extending blocker at a front end of the upper rail, the blocker sized to engage the stop when the drawer is in a flat orientation;
the recess sized to permit the stop to be moved past the blocker when the drawer is placed in a tilted orientation.

12. The combination of claim 11, wherein the blocker extends perpendicularly to the horizontal portion of the upper bar.

* * * * *

UNITED STATES PATENT AND TRADEMARK OFFICE
CERTIFICATE OF CORRECTION

PATENT NO. : 7,306,298 B2 Page 1 of 1
APPLICATION NO. : 10/444474
DATED : December 11, 2007
INVENTOR(S) : Matthew J. Doerfler et al.

It is certified that error appears in the above-identified patent and that said Letters Patent is hereby corrected as shown below:

In the Claims:

At Column 6, line 31, "first joint" should be -- first joint, --.

At Column 7, line 5, "plurality of rails" should be -- plurality of rails, --.

Signed and Sealed this

Seventh Day of October, 2008

JON W. DUDAS
*Director of the United States Patent and Trademark Office*